March 18, 1947.   G. A. TINNERMAN   2,417,718
ELECTRICAL TERMINAL CONNECTION
Filed Nov. 27, 1943
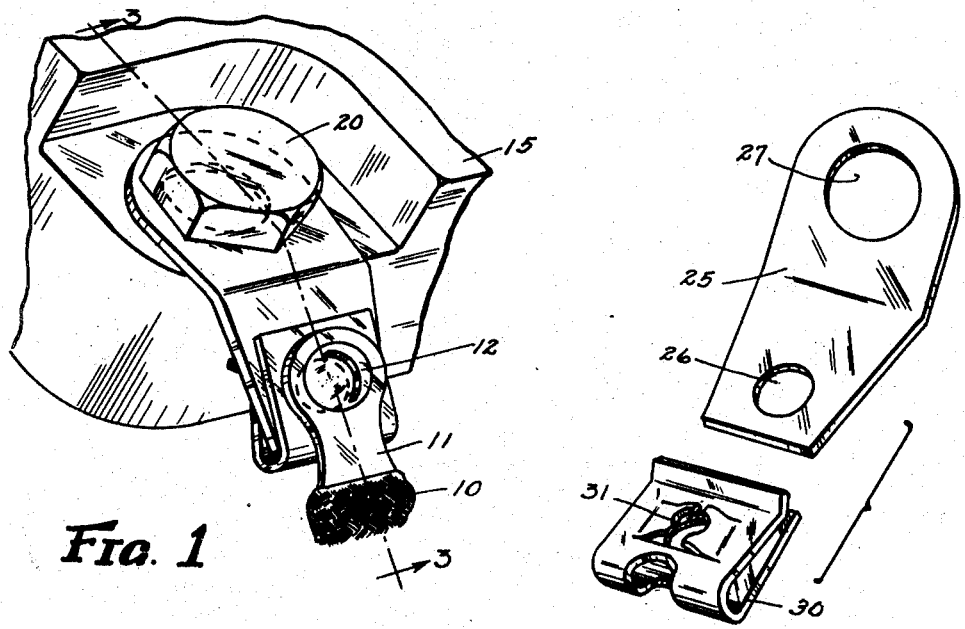
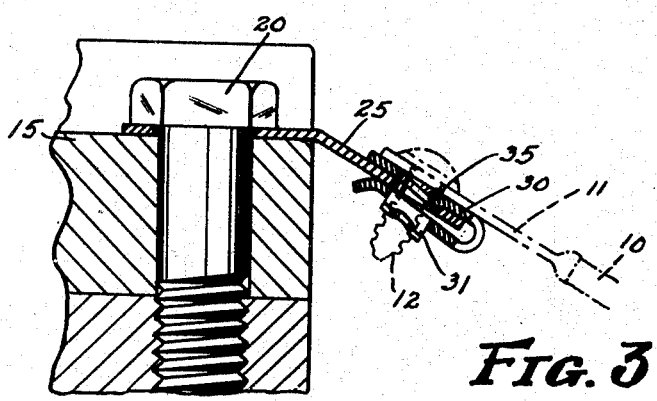
INVENTOR.
GEORGE A. TINNERMAN
BY
*Bates, Teare y McKee*
ATTORNEYS Patented Mar. 18, 1947

2,417,718

UNITED STATES PATENT OFFICE 2,417,718

ELECTRICAL TERMINAL CONNECTION

George A. Tinnerman, Cleveland, Ohio, assignor to Tinnerman Products, Inc., Cleveland, Ohio, a corporation of Ohio Application November 27, 1943, Serial No. 511,984

1 Claim. (Cl. 173—324)

This invention pertains to fastening devices and particularly to means for making a grounded connection for electrical equipment that is used in aircraft structures, although it is to be understood that the invention is not limited to such use.

In land and air vehicles of modern design, the electrical apparatus usually has one side of the line grounded and as a result every piece of electrical equipment is provided with a bonding jumper that must be connected to the common ground, and such connection usually is made by attaching the end of the jumper to the metallic framework or apparatus that is carried thereby through the medium of a threaded member, such as a bolt or the like. Considerable difficulty, however, has been experienced, particularly in aircraft work, in making a satisfactory grounding connection because the connecting lug at the end of the bonding jumper is usually relatively small, whereas the bolt or other fastening member through which the grounding connection is intended to be made, is usually much larger in size and varies considerably in diameter. A further difficulty in making the grounding connection has been the fact that the various component parts of an aircraft structure are usually made as sub-assemblies in plants remote from the final assembling location. Consequently, the sub-assemblies are inspected and approved at the sub-assembly plant and usually after all of the fastening members therefor have been securely locked in position. The practice, therefore, of loosening or removing any of the fastening members from the sub-assemblies to permit the attachment of a bonding jumper not only introduces a hazard of responsibility for satisfactory operation of the sub-assembly, resulting from removal of the fastening member at the location of the main assembly, but also necessitates a loss of considerable time in removing the fastener and then making certain that a replacement has not interfered with the operation of the sub-assembly. It is particularly important where the sub-assembly comprises articles that have a relatively fine degree of adjustment and where removal of the fastener for attachment of the bonding jumper is apt to interfere with such adjustment. Moreover, there is quite a loss of time in endeavoring to make the small bonding jumper fit a fastener that might be most conveniently located for attachment of the jumper.

An object of the present invention is to make a fastening device which will enable a grounding connection to be quickly made between a bonding jumper of one size and grounded fastening members of various sizes, and which will not possess the disadvantage of necessitating removal of the fastener from the sub-assembly, with its attendant objections and difficulties, as aforesaid.

Referring now to the drawings, Fig. 1 is a perspective view of a grounding connection embodying the present invention; Fig. 2 is an exploded perspective view of the invention, and Fig. 3 is a section taken on the line 3—3 in Fig. 1.

The bonding jumper with which my invention is illustrated is indicated at 10 as embodying an electrical conductor having a lug 11 projecting from the end thereof and provided with an opening for receiving the shank of a threaded fastener 12. The opening is adapted to receive a relatively small fastener and in the apparatus illustrated, the grounding connection is intended to be made to an article 15 which has a bolt 20 that is utilized for holding the part 15 in assembled relationship. Usually, such part embodies a sub-assembly, wherein the fastening member 20 is securely tightened and in some instances is locked against reverse rotation.

As may be observed from the drawings, the bolt 20 is considerably larger in diameter than the fastener 12, hence, to provide a satisfactory bonding connection to the bolt 20 without requiring removal thereof from the part 15, I utilize a tab 25, one end of which has an opening 26 to receive the fastener 12, and the other end of which has an opening 27 to receive the bolt 20. The opening 27 may be made large enough to receive various sizes of fastening members, such as those indicated at 20. The tab is attached to the part 15 at the time of assembly thereof, or it may be attached at the final assembly location in cases where removal of the fastener 20 will not be detrimental to the adjustment or operation of the sub-assembly. Additionally, the tab may be made in any desired length, suitable for the occasion. The tab is preferably a sheet metal strip, the thickness of which is insufficient to be tapped for effecting a locking engagement with the threads of the fastener 12. Accordingly, to effect an adequate assembly, I utilize a fastening device in the form of the clip 30 which embodies a strip of sheet material bent intermediately to provide arms for receiving the tab therebetween, and which has registering openings for receiving the shank of the fastener 12. The strip also carries thread-engaging means 31 which are shown as opposed tongues formed from the body of the clip and adjacent the fastener receiving aperture therein.

In practice, the clip is slipped over the end of the tab and is held in self-sustaining bolt receiving position thereon by means of a projection 35 that is adapted to enter the hole 26 as shown in Fig. 3. Thus, the lug on the bonding jumper may be brought into position with the opening therein in registration with the opening in the tab and clip, and the fastener 12 may be quickly inserted and turned to locking position.

An advantage of a device made according to the present invention is that a relatively small jumper connection may be quickly attached to bonding connections of much larger size and that the grounding may be accomplished without necessitating removal of any of the fastening members that normally are used for maintaining a subassembly in position.

I claim:

An electrical grounding device comprising a strip of metal having two openings respectively adjacent its opposite ends, one of said openings being adapted to receive a fastener for attaching the strip to a part to which the grounding connection is to be made, a separate U-shaped clip embracing said strip and overlapping the other opening thereof and having openings in each arm thereof registering with the last-mentioned opening in the strip, the material of said U-shaped clip being deformed about one of its openings to provide a projection receivable in the last mentioned opening in the strip to hold the clip in self-sustaining screw receiving position thereon, and one of said openings being deformed to constitute a thread engager whereby an electrical conductor having an opening may be attached by a single screw passing through the conductor and through both arms of the clip and through the strip, said screw holding the conductor in engagement with the clip and clamping the clip fixedly on the strip.

GEORGE A. TINNERMAN.

REFERENCES CITED

The following references are of record in the file of this patent:

UNITED STATES PATENTS

| Number | Name | Date |
|---|---|---|
| 1,326,632 | Becker et al. | Dec. 30, 1919 |
| 1,697,954 | Gribbie | Jan. 8, 1929 |
| 1,533,209 | Radu | Apr. 14, 1925 |
| 2,062,685 | Tinnerman | Dec. 1, 1936 |
| 2,256,637 | Anderson | Sept. 23, 1941 |
| 1,268,457 | Haynes et al. | June 4, 1918 |
| 1,946,862 | Koch, Jr. | Feb. 13, 1934 |

FOREIGN PATENTS

| Number | Country | Date |
|---|---|---|
| 359,346 | British | Oct. 22, 1931 |

OTHER REFERENCES

Bulletin No. 13, Kellogg Switchboard & Supply Co., pages 1 and 15, July 1904. (Copy in Div. 65.)